United States Patent
Yang et al.

(10) Patent No.: US 7,092,640 B2
(45) Date of Patent: Aug. 15, 2006

(54) METHOD OF SIMPLE CONTROL AND MANAGEMENT OF RECONFIGURABLE FIBER OPTIC DEVICES

(75) Inventors: Dan Dan Yang, Ottawa (CA); Greg Solberg, Half Moon Bay, CA (US)

(73) Assignee: Dowslake Microsystems Corporation, Santa Clara, CA (US)

( * ) Notice: Subject to any disclaimer, the term of this patent is extended or adjusted under 35 U.S.C. 154(b) by 689 days.

(21) Appl. No.: 09/961,362

(22) Filed: Sep. 25, 2001

(65) Prior Publication Data

US 2003/0128410 A1    Jul. 10, 2003

(51) Int. Cl.
*H04B 10/02* (2006.01)

(52) U.S. Cl. ...................... 398/177; 710/305
(58) Field of Classification Search ............... 398/53, 398/66, 107, 98, 82, 25, 106; 385/14; 700/19, 700/20, 59, 65
See application file for complete search history.

(56) References Cited

U.S. PATENT DOCUMENTS

| | | | |
|---|---|---|---|
| 5,099,348 A * | 3/1992 | Huddleston et al. | 398/107 |
| 5,671,375 A * | 9/1997 | Stockstad et al. | 710/305 |
| 6,804,469 B1 * | 10/2004 | Kasahara et al. | 398/177 |
| 2003/0058494 A1 * | 3/2003 | Roberts et al. | 359/115 |

\* cited by examiner

*Primary Examiner*—David C. Payne
(74) *Attorney, Agent, or Firm*—Cassan Maclean (57) ABSTRACT

Methods, systems and devices for communicating between a host optical systems controller and an optical subcontroller. A database residing in the optical subcontroller contains multiple possible valid command identifiers which define the format of any data following the command identifiers. Each device is equipped with a copy of the database. Each command identifier can be paired with a different action for a different device based on the database mapping. These command identifiers are sent from the host to the subcontroller with each command denoting a specific action to be taken by the subcontroller. Upon receipt of the command message, the subcontroller will determine the interpretation of a command identifier contained in the command message and execute the action associated with that command identifier. The subcontroller will then send a response message back to the host controller indicating the success or failure of the action denoted by the command identifier.

5 Claims, 4 Drawing Sheets

METHOD OF SIMPLE CONTROL AND MANAGEMENT OF RECONFIGURABLE FIBER OPTIC DEVICES

FIELD OF INVENTION

The present invention relates to optical communications, and more specifically to control systems for optical components and how these control systems communicate with each other.

BACKGROUND TO THE INVENTION

The recent increase in reliance on optical communication systems and optical networking has led to major developments in the field of optical devices and their control systems. Recently there has been a move towards the development of network control systems for optical devices. Essentially this means that a host optical system controller is networked with a multitude of optical subsystem controllers (referred to as subcontrollers). Each subcontroller directly controls at least one optical device. Clearly this development requires that methods of communication between the host controller and the subcontroller be developed. Unfortunately, as it stands there is no generic communications protocol between a host optical system controller and its subcontroller. Because of this, manufacturers have had to develop their own in-house protocols leading to a lack of compatibility between the products of different manufacturers. Not only that, but these in-house protocols are not upwardly nor downwardly compatible in that a new system's protocol will only work with that system's devices. It cannot work with legacy devices nor with devices that are subsequently developed. Unfortunately, this leads to higher development costs for systems in terms of both time and resources as each new system will have to be re-engineered to work with legacy devices.

It should also be noted that the current developments in the field of optical devices have given rise to electronically reconfigurable devices. Lasers, tunable filters, switches, and other optical devices can now be reconfigured on demand to more efficiently transfer or route optical channels. Real-time control of these devices has led to better control and more efficient use of resources. As an example, a diode laser operating at 980 nm can now be controlled in real time to provide the proper amount of amplification needed by channels passing through a system. A tunable add/drop filter can be requested, in real-time, to add or drop a particular channel or service to arrive at a specific and desired result. This real-time capability of current optical devices is well suited to the use of subcontroller which provide an interfere between the electrical/computer side of a control system and the electrical/optical device side of physical optical devices.

Since subcontrollers receive control data at one end and translate this into specific optical settings, a common data interface and protocol between these controllers would be particularly advantageous. Such a development would simplify the control scheme and allow interoperability between devices from different vendors. Furthermore, using a networking framework for such a control scheme would allow the migration of formerly network based technologies into the optical device control arena. And last, but not least, the interchangeability between optical devices attached to a subcontroller would speed device and device interface standardization in the optical device industry.

From the above, it is clear that there is a need for a communications protocol or a method of communicating between host and subcontrollers that is not only robust but can service the needs of not only legacy but also of future devices.

SUMMARY OF THE INVENTION

The present invention meets the above needs by providing methods, systems and devices for communicating between a host optical systems controller and an optical subcontroller. A database residing in the optical subcontroller contains multiple possible valid command identifiers which define the format of any data following the command identifiers. Each device is equipped with a copy of the database. Each command identifier can be paired with a different action for a different device based on the database mapping. These command identifiers are sent from the host to the subcontroller with each command denoting a specific action to be taken by the subcontroller. Upon receipt of the command message, the subcontroller will determine the interpretation of a command identifier contained in the command message and execute the action associated with that command identifier. The subcontroller will then send a response message back to the host controller indicating the success or failure of the action denoted by the command identifier. If the action was successful, the response message will have the same command identifier as the command message that the response message is responsive to. If the action is not successful, then an error response is sent to the host controller. Since the database contains all the possible valid command identifiers and the data format of any data associated with the command identifier, the database can be easily updated when new devices are developed. The system is therefore upwardly compatible in that future devices can take advantage of the database. Future host controllers can, therefore, control legacy subcontrollers.

On the device side, this communication system is transparent to optical devices controlled by the subcontroller, thereby allowing the use of both legacy and future developed optical devices as their interface is with the subcontroller and not with the actual optical devices.

In a first aspect the present invention provides a method of communicating between a host optical system controller and an optical subcontroller, the method comprising:

sending an initial command message from said host to said subcontroller, said command message including a first command identifier indicating a command from said host to said subcontroller;

receiving said first command message at said subcontroller;

consulting a command database at said subcontroller to interpret said first command message, said database containing multiple possible valid command identifiers, each command identifier having a corresponding interpretation and action in said database based on a specific type of optical device connected to said subcontroller;

at said subcontroller, implementing an action corresponding to said first command message based on said corresponding interpretation of said command identifier and formulating a proper response to said command identifier based on a result of said corresponding action; and sending a response message from said subcontroller to said host, said response message indicating a success or failure of said corresponding action, wherein said subcontroller ignores subsequent command messages received prior to sending a response message responsive to the first command message.

In a second aspect the present invention provides a database for use in communications between a host optical system controller and an optical subcontroller, said database containing multiple possible valid command identifiers which may be sent from the host to the subcontroller, each valid command identifier causing said subcontroller to perform an action once received by said subcontroller.

In a third aspect the present invention provides a command message sent from a host optical system controller to an optical subcontroller, said command message including a command identifier which defines a format of data included in said message.

In a fourth aspect the present invention provides a response message sent from an optical subcontroller to a host optical system controller in response to a command message from said host, said response message including a command identifier identical to a command identifier identical to a command identifier of said command message, said command identifier defining a format of data included in said response message.

In a fifth aspect the present invention provides a method of controlling an optical subsystem, the method comprising:
  a) sending a command message from a host controller to a subcontroller;
  b) receiving said command message at said subcontroller;
  c) decoding said command message at said subcontroller; and
  d) interpreting contents of said command message based on what type of optical device is addressed by said command message.

In a sixth aspect the present invention provides a set of command identifiers for use with a control system for reconfigurable optical devices, each commands identifier in the set being sent from a host controller to a subcontroller controlling at least one reconfigurable optical device, each command identifier being processed by the subcontroller when received and causing the subcontroller to perform an action affecting the at least one reconfigurable optical device.

BRIEF DESCRIPTION OF THE DRAWINGS

A better understanding of the invention may be obtained by reading the detailed description of the invention below, in conjunction with the following drawings, in which.

DETAILED DESCRIPTION OF THE INVENTION

Figure 1:
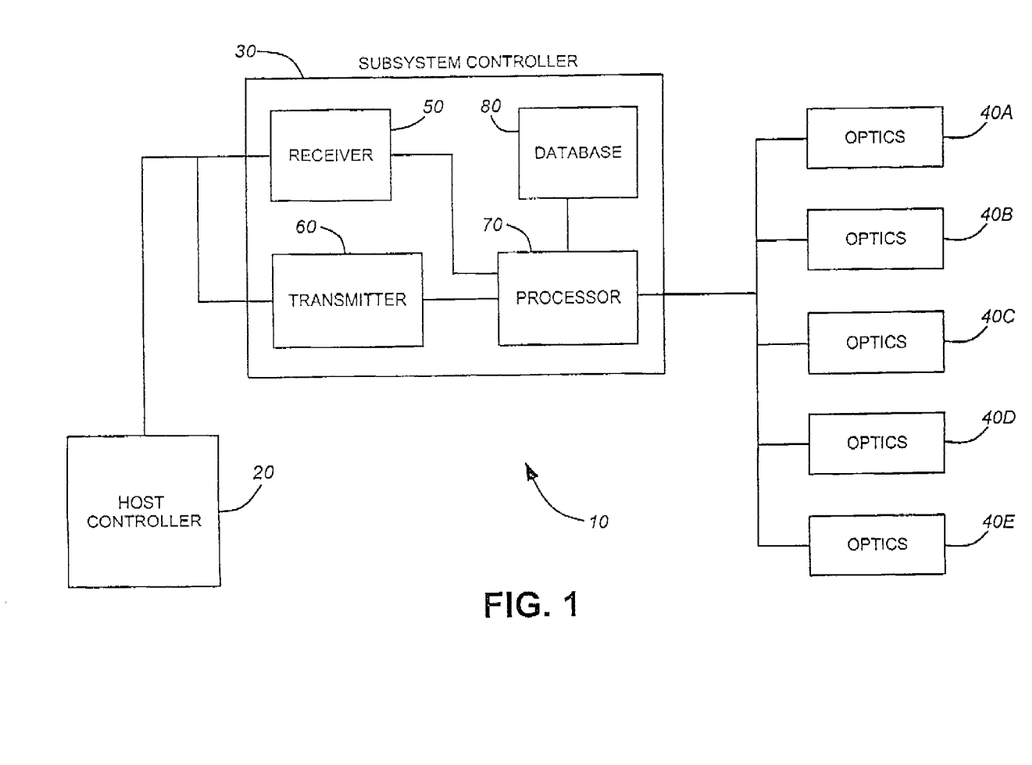
FIG. 1 is a block diagram of an optical device control system on which the invention may be implemented.

Referring to FIG. 1, a control system 10 for optical devices is illustrated. A host optical system controller 20 is in communication with an optical subcontroller 30. The subcontroller 30 is, in turn, coupled to optical devices 40A, 40B, 40C, 40D, and 40E. Within the subcontroller 30 is a message receiver 50, message transmitter 60, processor 70, and database 80. While FIG. 1 only illustrates one subcontroller in communication with the host controller, multiple subcontrollers can be in simultaneously communication with the host controller 20.

The subcontroller 30 receives command messages from the host controller 20 through the message receiver 50. The command message is then passed to the processor 70. The processor 70 decodes the command message by referring to the database 80. After decoding the controller message, the processor 70 then implements what is commanded by the command message. If settings are to be changed for any of the optical devices 40A, 40B, 40C, 40D, or 40E, the processor 70 implements the changes by communicating with the optical devices. After implementing the commands requested by the host 20, the processor 70 will transmit a response message to the host 20 through the message transmitter 60.

Figure 2:
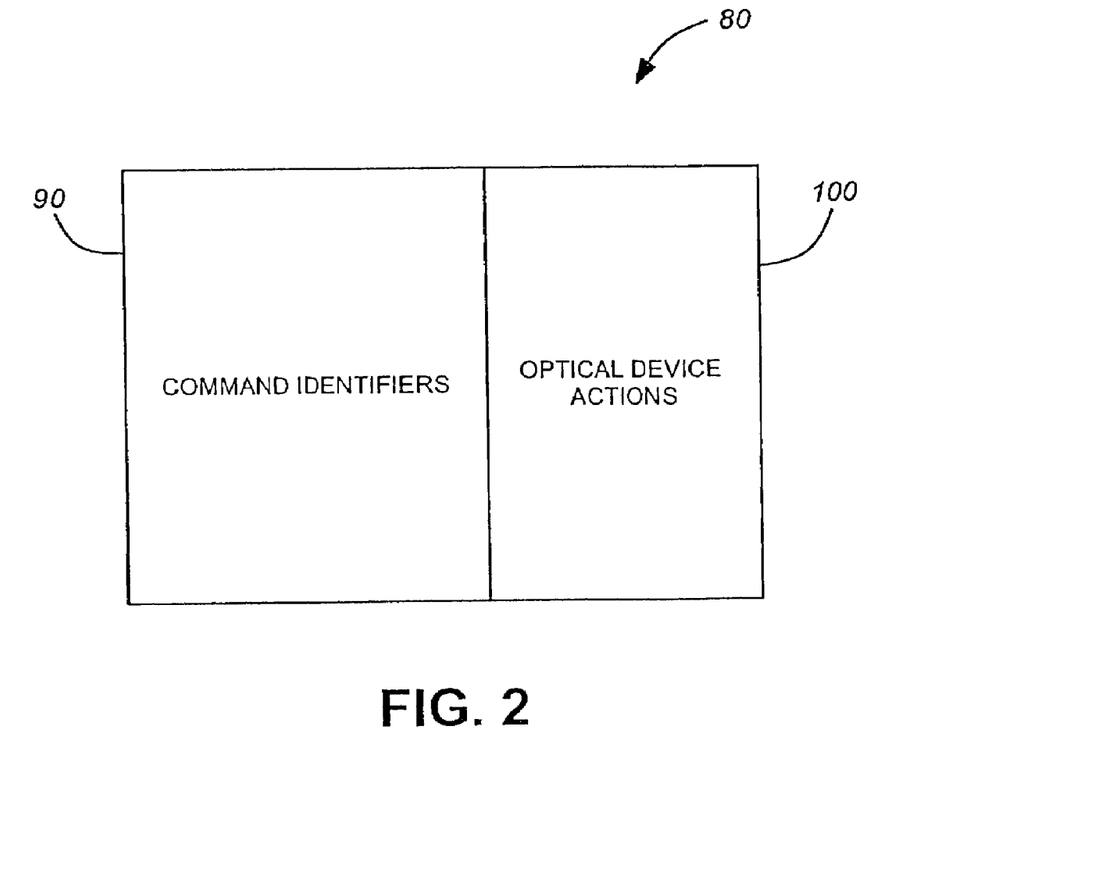
FIG. 2 is a block diagram showing the division in the database according to one aspect of the invention.

The format and division of the database 80 is illustrated in FIG. 2. The database 80 is divided into 2 sections—a section 90 for command identifiers and a section 100 for optical device actions. The section 90 for the command identifiers contain the valid command identifiers which the host controller 20 can send to the subcontroller 30. The processor 70, after receiving the command message from the message receiver 50, determines if the command identifier it received is valid by checking the database 80. Based on the command identifier received, specific actions may be made by the optical devices attached to the subcontroller 30.

Each valid command identifier in the database 80 is mapped to a specific action for a specific device attached to the subcontroller. Thus, if two different optical devices are attached to the subcontroller, each of these devices may have a different action mapped to a single command identifier. The subcontroller will decode the command message based not only on the command identifier contained in the message but based also on the optical device addressed by the command message.

Since the possible commands to the optical device can be reduced to a few simple commands with a few options per command, a small set of command identifiers can be used to implement most if not all reconfiguration requirements for the optical devices. It has been found that a command set of about 10 command identifiers can provide a robust set which meets the needs of most optical devices to be controlled and reconfigured.

These command identifiers are used not only by the host controller but also by the subcontroller. This is because each command message from the host is to be responded to by the subcontroller. Each command message is to be answered with exactly one positive or negative response message from the subcontroller. Each command message has one command identifier which uniquely defines the format message data contained in the message. A positive response to a message will contain the same command identifier as the command message being responded to. The error response identifier will alert the host controller that an error was encountered at the subcontroller while trying to execute the command sent by the host controller.

In terms of addressing, a flexible addressing scheme is used to address one or more devices. A device address consists of a hierarchy or 3 numbers: Port Number, Path Number and Device Number. The Port Number refers to the physical optical connection (i.e. an input port and output port). The Path Number refers to an optical path connected to the specified port. A Path Number must always be qualified by a Port Number. The Device Number refers to a specific device in the specified path. Some devices are outside any optical path and are addressed with a Path Number equal to 0. A Device Number must always be qualified by a Path Number (or 0) and a Port Number.

Figure 3:
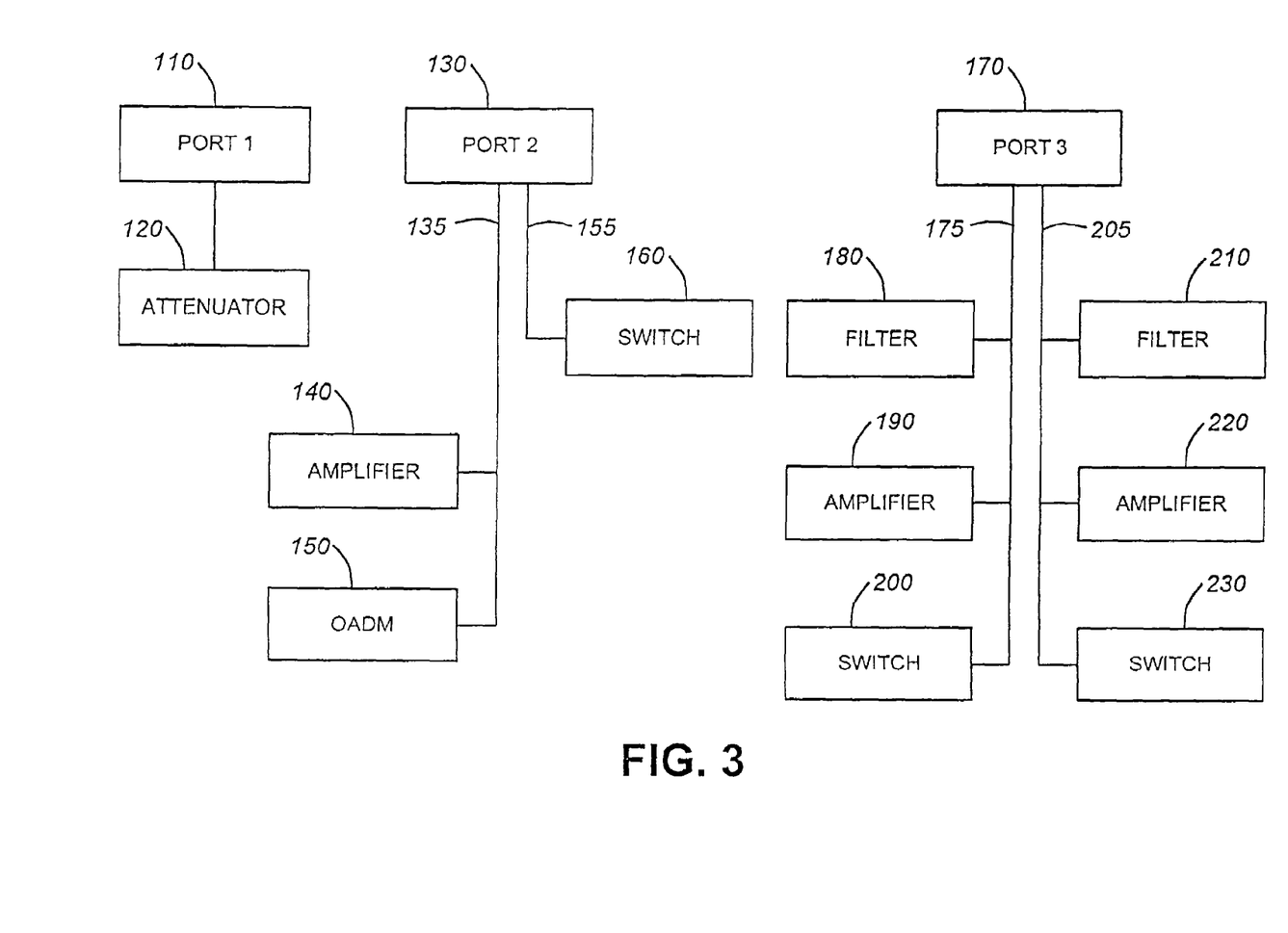
FIG. 3 is block diagram illustrating topology of optical devices controlled by one subcontroller.

To further clarify the addressing scheme outlined above, an example using the subsystem topology illustrated in FIG. 3 is provided. Referring to FIG. 3, a topology of multiple optical devices controlled by one subcontroller is illustrated. A first output port (PORT1) 110 is coupled to an attenuator 120. A second output port (PORT2) 130 is coupled on a first path 135 to a first amplifier 140 and an OADM (optical add/drop multiplexer) 150.

Also coupled to the second output port 130, but via a second path 155, is a switch 160. A third output port (PORT3) 170 has its first path 175 communicating with a filter 180, an amplifier 190, and a switch 200. On this third port 170's second path 205 are attached a filter 210, an amplifier 220, and a switch 200.

For the topology in FIG. 3, an address mapping may be as shown in Table A. The Device column in Table A merely provides the device and its reference number for ease of reference.

TABLE A

| Port Number | Path # | Device # | Device |
|---|---|---|---|
| 1 | 1 | 1 | Attenuator (120) |
| 2 | 1 | 1 | Amplifier (140) |
| 2 | 1 | 2 | OADM (150) |
| 2 | 2 | 1 | Switch (160) |
| 3 | 1 | 1 | Filter (180) |
| 3 | 1 | 2 | Amplifier (190) |
| 3 | 1 | 3 | Switch (200) |
| 3 | 2 | 1 | Filter (210) |
| 3 | 2 | 2 | Amplifier (220) |
| 3 | 2 | 3 | Switch (230) |

Thus, a first device may have the same device number as a second device as long as their port and/or their path numbers are different. This can be seen with filter 180 and filter 210 as both have the same port number and device number but have different path numbers. It should be noted that Table A is presented merely as an illustration of a sample topology for a set of optical devices to be controlled by a subcontroller. To simplify the addressing scheme, each device can be referenced by a 3 element vector coordinate system with each element denoting a specific port, path, or device in that sequence. Thus, amplifier 140 would have coordinates (2, 1, 2) denoting port 2, path 1, and device 1. Similarly, amplifier 220 would have coordinates (3, 2, 2).

From the above, both the command and the response messages will follow a similar specific format. Each regular command message will contain a command identifier, and an address referencing a specific device/path. Additional data may be appended to regular messages that may denote setting identifiers and their values. As an example, if a command message is to set a specific device parameter to a specified value, the command message will not only contain the command identifier for that command and the address of the device, but also the value to which the parameter is to be set.

Regarding the database, as noted above, it is to contain the command identifiers and their mapping to specific devices and actions for these devices. To accomplish this, the database takes the form of an internal mapping table used in the subcontroller. This mapping table maps each device attached to the subcontroller with its address, its type or mode of operating command identifiers applicable to it, and any optical parameter required by the command identifier or observed by the device. By using this internal mapping table, the subcontroller can retrieve from the database the proper interpretation of the command identifier for the specific device addressed.

As an example of the internal mapping table, Table B below is provided:

TABLE B

| Column 1 | Column 2 | Column 3 | Column 4 |
|---|---|---|---|
| Command ID1 | Address 1 | Type/Mode | Optics parameter value 1 |
| Command ID2 | Address 2 | Type/Mode | Optics parameter value 2 |
| . | . | . | . |
| . | . | . | . |
| . | . | . | . |
| Command IDn | Address n | Type/Mode | Optics parameter value n |
| Command ID(n+1) | Address (n+1) | Type/Mode | Optics parameter value (n+1) |

As can be seen from table B, column 1 are the command identifiers, column 2 are the addresses of the devices to which the command identifiers apply, column 3 are the operating modes or operating types of the devices, and columns 4 are the values required by the command identifier. Column 4 provides not only the values required by the command identifier from the main controller but it may also contain data which the command identifier retrieves from the optical device.

As an example of a portion of a database in the form of an internal mapping table, Table C is provided below. It should be noted that Table C uses the mapping and topology of Table A devices.

TABLE C

| Command | Address | Mode | Parameter |
|---|---|---|---|
| Om | 1, 1, 1 | G | 2 dB |
| Om | 1, 1, 1 | C | 3 mA |
| Om | 1, 1, 1 | P | 2 mW |
| Om | 2, 1, 1 | G | 3 dB |
| Om | 2, 1, 1 | C | 8 mA |
| Om | 2, 1, 1 | P | 5 mW |
| Om | 2, 1, 2 | G | — |
| Om | 2, 1, 2 | C | 5 mA |
| Om | 2, 1, 2 | P | 3 mW |

To explain Table C, its fields correspond to the columns in Table A. Thus, the first column or field identifies the command identifiers and the second column or field identifies the address of the device to which the command identifier applies in the port, path, device format as explained above. The third field identifies the operating mode requested of the optical device or the operating parameter to be set or the operating parameter value being queried. In the above example, as will be explained below, the operating parameter value being queried. In the above example, as will be explained below, the operating parameter or mode valves refer to the following:

| Mode/Parameter | Action/Parameter |
|---|---|
| G | gain/attenuation setting |
| C | constant current output setting |
| P | constant power output setting |

To further explain the database lookup process, an example is provided below. For this example, the command message format will be as outlined above and the topology in FIG. 3 and the mapping in Table A will be used. message for a particular command identifier need not always be present. If this parameter field is not present, then the subcontroller reports whatever value is stored or set for that particular device/opmode combination.

Once the action required of the optical device has been executed, the subcontroller can then formulate and send a response message to the host controller. As noted above, such a response message will have a very similar format to the original command message if the execution was successful. In fact, the process can be simplified by sending the same command message back to the host controller as the relevant data is already encapsulated in that command message. On the other hand, if an error message is to be generated, it must include a command message identifier which identifies the command message that generated the error. The error response message may have the following format in terms of fields:

| Field: | Type | ID | Device | Port | Path |
|---|---|---|---|---|---|
| Value: | ERROR | | | | |

The type field denotes that the message is an error message and the rest of the fields identify the command identifier that caused the error and the optical device to which the command identifier was addressed.

Regarding the actual command identifier which may be used in the command messages, the following table (Table D) lists some possible command identifiers and their generic descriptions. The actual mapping of these command identifiers with optical device actions will depend not only on the optical device but also on the system designer.

In this example, a command message having the following fields and values is sent from the host controller to a subcontroller:

| ID | Address | OpMode | Value |
|---|---|---|---|
| OM | (2, 1, 1) | C | 10 |

The first field (ID) denotes the command identifier. This particular command identifier (value OM) is generically predetermined to mean SET OUTPUT MODE. The ADDRESS field indicates which port, path, and device is being addressed. The OpMode or operating mode field determines which parameter is being set in the device while the value in the VALUE fields determines the numerical value to which the parameter is to be set.

From all of the above, the process proceeds as follows: The command message is received by the subcontroller and decoded to extract the command identifier ('OM') and the device address (Port=2, Path=1, Device=1). From this data, the subcontroller checks the internal device mapping table (Table C) to determine the interpretation of the command identifier. From the entry in Table C, it can be seen that for OpMode=G, the relevant parameter field value is 3 dB. However, since the command message has a value attached to the message, then the current value stored in the database is to be overwritten. The gain value for the device at address (2, 1, 1) is therefore to be set at 10 dB. If there was no value attached to the message, then the subcontroller merely reads the value stored for the command identifier and the specific device and OpMode (3 dB) and sends that value as a response to the command message.

A similar process to the above would be used in handling other command messages.

It should be noted that not all command identifiers require specific device addresses nor specific opmode values to function. If a command message only has a port address associated with its command identifier, then that command identifier is applied to all devices attached to that port. Similarly, if the address is composed merely of a port number and a path number, the command identifier is applied to all devices having that specific port and path number. Thus, from Tables A and C, if the following command message of

OM (2, 1) G was sent from the host to the subcontroller, then the gain setting for devices having the addresses (2, 1, 1) and (2, 1, 2) would be sent back to the host as both these devices have port=2 and path=1.

Similar to the above, if no opmode is attached to the command message, all opmodes are canvassed for reporting to the host. Thus, again from Tables A and C, if the command message

OM (2, 1)

were sent to the subcontroller, all opmodes for devices having port=2, path=1 would be checked and reported to the host. Value settings for both device at addresses (2, 1, 1) and (2, 1, 2) would be reported to the host for opmodes G, C, and P. As a fail-safe for setting values, the subcontroller would return to the host whatever value is to be set for a specific opmode for a specific device when the command message changes a stored value for that specific device. It should be noted that the value or parameter field in the command

TABLE D

| ID | Address | Mode/Type | Value Parameter | Description |
|---|---|---|---|---|
| CS | Port# | P (if power level) N (if OSNR) W (if wavelength) | Value | Report Channel Status: Power, OSNR and wavelength |
| AL | port#,path#, device# | DI (device current) TE (temperature) DV (device voltage) PS (power supply) PP (photodiode power) CN (channel OSNR) CW (channel wavelength) | Value | Get Alarm Notification |
| TH | port#,path#, device# | DI (device current) TE (temperature) DV (device voltage) PS (power supply) CP (channel power) CN (channel OSNR) CW (channel wavelength) | Value | Get/set alarm thresholds |
| PP | port#,path#, | | Value | Report Power Levels by PDs |
| ST | port#,path#, device# | DI (device current) TE (temperature) DV (device voltage) PS (power supply) CP (channel power) CN (channel OSNR) | Value | device status: check individual device operating status. (Empty byte from host will result all |

TABLE D-continued

| ID | Address | Mode/Type | Value Parameter | Description |
|---|---|---|---|---|
| OM | port#,path#, device# | CW (channel wavelength) C (constant device control) P (automatic output control) G (automatic compensation control | Value | possible values) Get/set outpout mode and value for dispersion management |
| DM | port#,path#, | C (constant device control) P(automatic output control) G(automatic compensation control | Value | Get/set Active channels |
| CH | port#, | | Value | set path (for example, PT 08 16 means switch port 08 to port 16) |
| PT | port#, | | Value (another port #) | |

Figure 4:
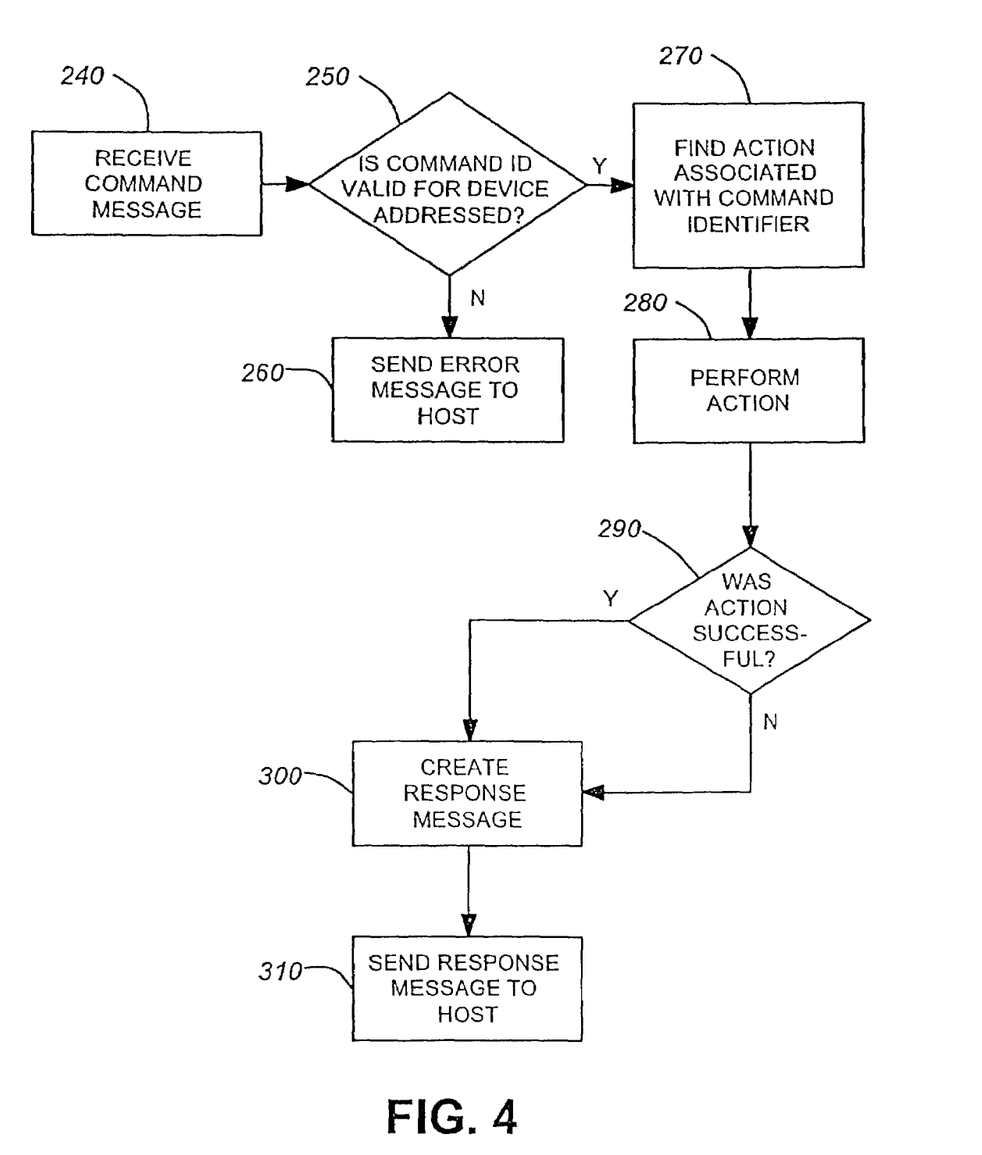
FIG. 4 is a flow chart detailing the steps in a process according to one aspect of the invention.

To reiterate the process of outlined above, FIG. 4 illustrates a flow chart detailing the steps in the process. The process begins with step 240 with the subcontroller receiving a command message. The next step is a decision 250 that determines whether the command identifier is valid for the device addressed by the command message. As noted above, this can be done by extracting the command identifier and the address information from the command message. If the command identifier is not valid, then step 260 is that of sending an error message to the host controller. On the other hand, if the command identifier is valid for the given device, then step 270 is that of finding the action associated with the command identifier for the given device. Again as noted above, this is done by checking the database for the proper record that would determine the interpretation of the command identifier. After the relevant action is found, step 280 recounts the optical device performing the action dictated by the command identifier as interpreted by the database entry. Step 290 determines whether the action is successful. If the action is successful, then a positive response message is created. If the action is not then a negative or an error response message is created (Step 300). Step 310 is that of sending the response message to the host.

It should be noted that updating the database is required if new types of optical devices are to be attached to a subcontroller. Furthermore, the subcontroller will have to be updated so that it may handle any new commands or actions required for the new device type.

While the above description describes a host controller as controlling the subcontroller, the host controller and the subcontroller may be resident on the same system. Thus, in this configuration, a host controller would in essence be its own subcontroller and be able to send commands to the optical devices attached to the system. Also, the host controller need not be a machine with a human at the controls. The host controller can be merely a computer that manages an optical network from a location remote from the subcontroller systems. To extend the concept further, a host controller may be controlled itself by another controller higher in the hierarchy of the network. From the above, a subcontroller need not necessarily be a subcontroller but can be any control device that issues commands to optical devices based on entries in the database.

The crux of the above system as described above is therefore the database and the supporting logic surrounding that database. The system can therefore receive commands from controllers higher in the hierarchy, translates these commands into commands and subcommands for devices that are lower in the hierarchy. With such a system, controllers that are higher in the hierarchy are therefore divorced from the specifics of the optical devices. An end user at the controls of a host controller can therefore control and set parameters for the end optical devices without having to have a knowledge of the specifics of the optical device and without having to have a knowledge of the control parameters required by the optical device. Such an end user can merely set a specific parameter for an optical device and send these parameters and an appropriate command to the subcontroller. The subcontroller then receives these commands and parameters and translates them so that they can be understood and implemented by the optical devices attached to the subcontroller.

A person understanding the above-described invention may now conceive of alternative designs, using the principles described herein. All such designs which fall within the scope of the claims appended hereto are considered to be part of the present invention.

We claim:

1. A method of communicating between a host optical system controller and an optical subcontroller, the method comprising:
    sending an initial command message from said host to said subcontroller, said command message including a first command identifier indicating a command from said host to said subcontroller;
    receiving said first command message at said subcontroller;
    consulting a command database at said subcontroller to interpret said first command message, said database containing mulitple possible valid command identifiers, each command identifier having a corresponding interpretation and action in said database based on a specific type of optical device connected to said subcontroller;
    at said subcontroller, implementing an action corresponding to said first command message based on said corresponding interpretation of said command identifier and formulating a proper response to said command identifier based on a result of said corresponding action; and
    sending a response message from said subcontroller to said host, said response message indicating a success or failure of said corresponding action, wherein said subcontroller ignores subsequent command messages received prior to sending a response message responsive to the first command message, and wherein said subcontroller controls at least one optical device for use in optical networking,
    and wherein in the event said corresponding action is successful, said response message will include said first command identifier,
    and wherein in the event said corresponding action is a failure, said response message is an error message.

2. A method as in claim 1 wherein each response message includes at least one optical parameter to be set by said optical subcontroller.

3. A method as in claim 1 wherein said first command message includes at least one optical parameter to be set by said optical subcontroller.

4. A method as in claim 3 wherein said first command message further includes at least one magnitude to which said at least one optical parameter is to be set.

5. A method as in claim 1 wherein said first command message further includes addressing data indicating a portion of an optical subsystem controlled by said optical subcontroller to which the command is to be applied.

* * * * *